(12) United States Patent
Iizuka (10) Patent No.: US 9,444,961 B2
(45) Date of Patent: Sep. 13, 2016

(54) IMAGE FORMING APPARATUS, METHOD FOR CONTROLLING IMAGE FORMING APPARATUS, AND PROGRAM, FOR REDUCED POWER CONSUMPTION

(71) Applicant: CANON KABUSHIKI KAISHA, Tokyo (JP)

(72) Inventor: Toshiaki Iizuka, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/402,296

(22) PCT Filed: May 13, 2013

(86) PCT No.: PCT/JP2013/003047
§ 371 (c)(1),
(2) Date: Nov. 19, 2014

(87) PCT Pub. No.: WO2013/175728
PCT Pub. Date: Nov. 28, 2013

(65) Prior Publication Data
US 2015/0138593 A1 May 21, 2015

(30) Foreign Application Priority Data
May 21, 2012 (JP) ................ 2012-115761

(51) Int. Cl.
| G06F 3/12 | (2006.01) |
| G06F 1/26 | (2006.01) |
| G06F 1/32 | (2006.01) |
| G06F 1/00 | (2006.01) |
| H04N 1/00 | (2006.01) |
| G06K 15/00 | (2006.01) |

(52) U.S. Cl.
CPC ........ *H04N 1/00896* (2013.01); *G06F 1/3209* (2013.01); *G06K 15/406* (2013.01); *H04N 1/00891* (2013.01); *H04N 1/00973* (2013.01); *H04N 2201/0094* (2013.01)

(58) Field of Classification Search
CPC ...... G06F 1/3287; G06F 1/26; G06F 1/3209; G06F 1/3203; G06F 1/3284; G06F 1/3293; G06F 1/324; G06F 1/3296; G06F 1/3228; G06F 1/329; G06F 1/32; G06F 1/3206; G06F 1/3227; G06F 3/1229; G06F 3/1221; Y02B 60/12; Y02B 60/1267; Y02B 60/34; Y02B 60/1271; Y02B 60/1278; Y02B 60/1282; H04N 1/00896; H04N 1/00885; H04N 1/00888; G03G 15/5004
USPC ....... 358/1.13–1.15, 305; 713/310, 320–324; 709/230, 232
See application file for complete search history.

(56) References Cited

U.S. PATENT DOCUMENTS

| 8,045,200 B2 * | 10/2011 | Yamasaki et al. ............ 358/1.15 |
| 8,767,238 B2 * | 7/2014 | Kojima ........................ 358/1.15 |
| 2009/0282278 A1 * | 11/2009 | Satoh .................... G06F 1/3209 713/321 |

(Continued)

FOREIGN PATENT DOCUMENTS

| JP | 2007-105916 A | 4/2007 |
| JP | 2007-164352 A | 6/2007 |

(Continued)

OTHER PUBLICATIONS

International Search Report and Written Opinion for PCT/JP2013/003047, dated Jul. 30, 2013.

*Primary Examiner* — Mohammad Ghayour
*Assistant Examiner* — Jonathan R Beckley
(74) *Attorney, Agent, or Firm* — Canon U.S.A., Inc. IP Division (57) ABSTRACT

An image forming apparatus including a main control unit and a communication unit includes a receiving unit configured to receive a packet via a network when the main control unit and the communication unit are in a power saving state, a first canceling unit configured to cancel the power saving state of the communication unit in response to receiving of the packet by the receiving unit, a first determination unit configured to determine whether to cancel the power saving state of the main control unit based on the packet received by the receiving unit when the first canceling unit has canceled the power saving state of the communication unit, and a second canceling unit configured to cancel the power saving state of the main control unit when the first determination unit has determined to cancel the power saving state of the main control unit.

9 Claims, 10 Drawing Sheets

(56) References Cited

U.S. PATENT DOCUMENTS

2011/0194148 A1* 8/2011 Kobayashi .......... G06K 15/406
358/1.16

FOREIGN PATENT DOCUMENTS

| JP | 2009-151537 A | 7/2009 |
| JP | 2010-193126 A | 9/2010 |

* cited by examiner

IMAGE FORMING APPARATUS, METHOD FOR CONTROLLING IMAGE FORMING APPARATUS, AND PROGRAM, FOR REDUCED POWER CONSUMPTION

TECHNICAL FIELD

The present invention relates to an image forming apparatus, a method for controlling the image forming apparatus, and a program.

BACKGROUND ART

In recent years, in an image forming apparatus such as a printer or a digital multifunction peripheral, a demand for reduction in unnecessary power consumption has increased. To achieve such a demand, there has been known a method in which the power consumption of the image forming apparatus is decreased by reducing or cutting off power supply to a main control unit in the image forming apparatus when the image forming apparatus does not operate for a predetermined period of time, while supplying power to a communication unit in the image forming apparatus. Japanese Patent Application Laid-Open No. 2009-151537 discusses a method of responding, when the communication unit receives a packet sent from outside the apparatus with power supply to the main control unit reduced or cut off, to the packet received by the communication unit without awaking the main control unit.

In Japanese Patent Application Laid-Open No. 2009-151537, by allowing the main control unit to shift to a power saving state, a reduction in power consumption of the image forming apparatus can be achieved. However, Japanese Patent Application Laid-Open No. 2009-151537 does not pay any attention to allowing the communication unit to shift to a power saving state. In Japanese Patent Application laid-Open No. 2009-151537, the communication unit is not in a power saving state even if the communication unit waits for receiving a packet. Therefore, power is uselessly consumed when the communication unit waits for receiving the packet.

SUMMARY OF INVENTION

The present invention is directed to an image forming apparatus that implements further power saving of the image forming apparatus by achieving a power saving state not only of a main control unit but also of a communication unit in the image forming apparatus.

According to an aspect of the present invention, an image forming apparatus including a main control unit and a communication unit includes a receiving means for receiving a packet via a network when the main control unit and the communication unit are in a power saving state, a first canceling means for canceling the power saving state of the communication unit in response to receiving of the packet by the receiving means, a first determination means for determining whether to cancel the power saving state of the main control unit based on the packet received by the receiving means when the first canceling means has canceled the power saving state of the communication unit, and a second canceling means for canceling the power saving state of the main control unit when the first determination means has determined to cancel the power saving state of the main control unit.

Further features and aspects of the present invention will become apparent from the following description of exemplary embodiments with reference to the attached drawings.

DESCRIPTION OF EMBODIMENTS

Various exemplary embodiments, features, and aspects of the invention will be described in detail below with reference to the drawings.

Figure 1:
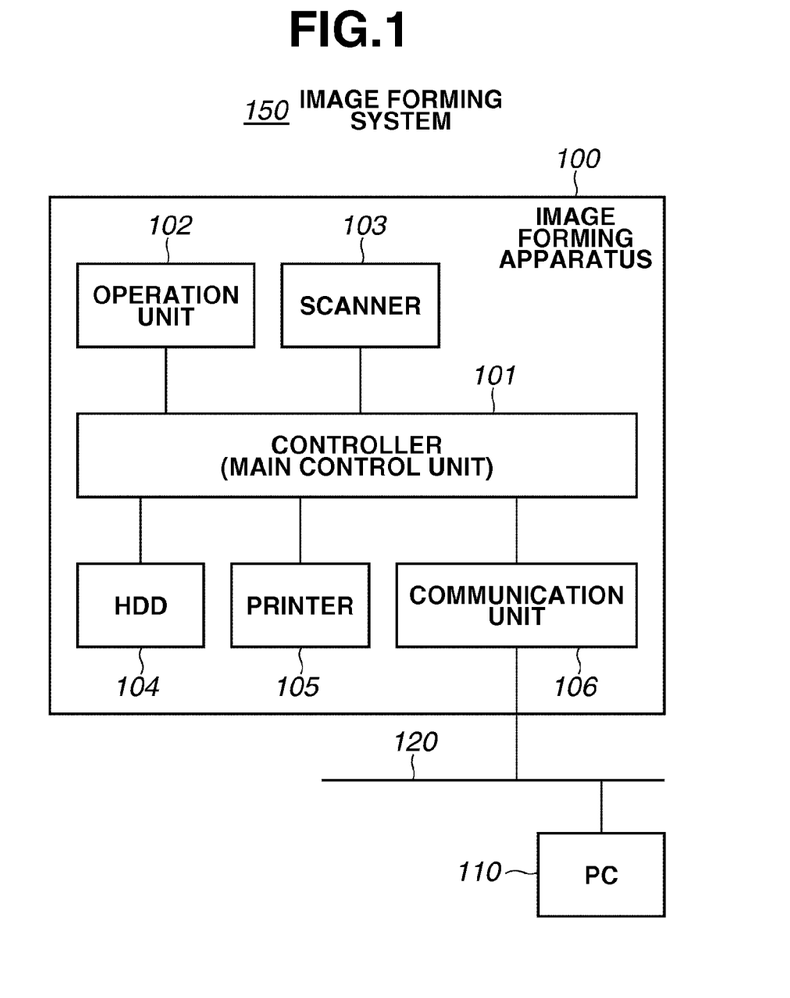
FIG. 1 illustrates an image forming system according to a first exemplary embodiment of the present invention.

A configuration of an image forming system 150 according to a first exemplary embodiment of the present invention will be described with reference to FIG. 1. The image forming system 150 includes an image forming apparatus 100 and a personal computer (PC) 110. The image forming apparatus 100 and the PC 110 are connected to enable communication with each other via a network 120 such as Ethernet (registered trademark).

The image forming apparatus 100 is a digital multifunction peripheral including a copy function, a print function, a scan function, and a sending function. A controller (main control unit) 101 including a central processing unit (CPU) 201, described below, controls the entire operation of the image forming apparatus 100.

An operation unit 102 includes a liquid crystal display unit having a touch panel function and a keyboard. A user can operate the image forming apparatus 100 using the operation unit 102. A hard disk drive (HDD) 104 stores image data and a control program for executing each of flowcharts, described below. A communication unit 106 connects the controller 101 (the image forming apparatus 100) to the network 120. The image forming apparatus 100 receives a print job, which has been sent from the PC 110, via the communication unit 106, and performs print processing based on the print job. In addition to receiving the print job, the image forming apparatus 100 can send and receive information to and from the PC 110 and other external apparatuses via the communication unit 106. Respective configurations of the controller 101 and the communication unit 106 will be specifically described with reference to FIG. 2.

A scanner 103 reads a document and generates image data (reading processing). The image data generated through the reading processing is input to the controller 101, and processing, based on the operation by the user, such as printing by a printer 105, storing in the HDD 104, and sending to the PC 110 by the communication unit 106 is performed. The printer 105 performs print processing based on the print job received via the communication unit 106 and the image data generated by the scanner 103.

Figure 2:
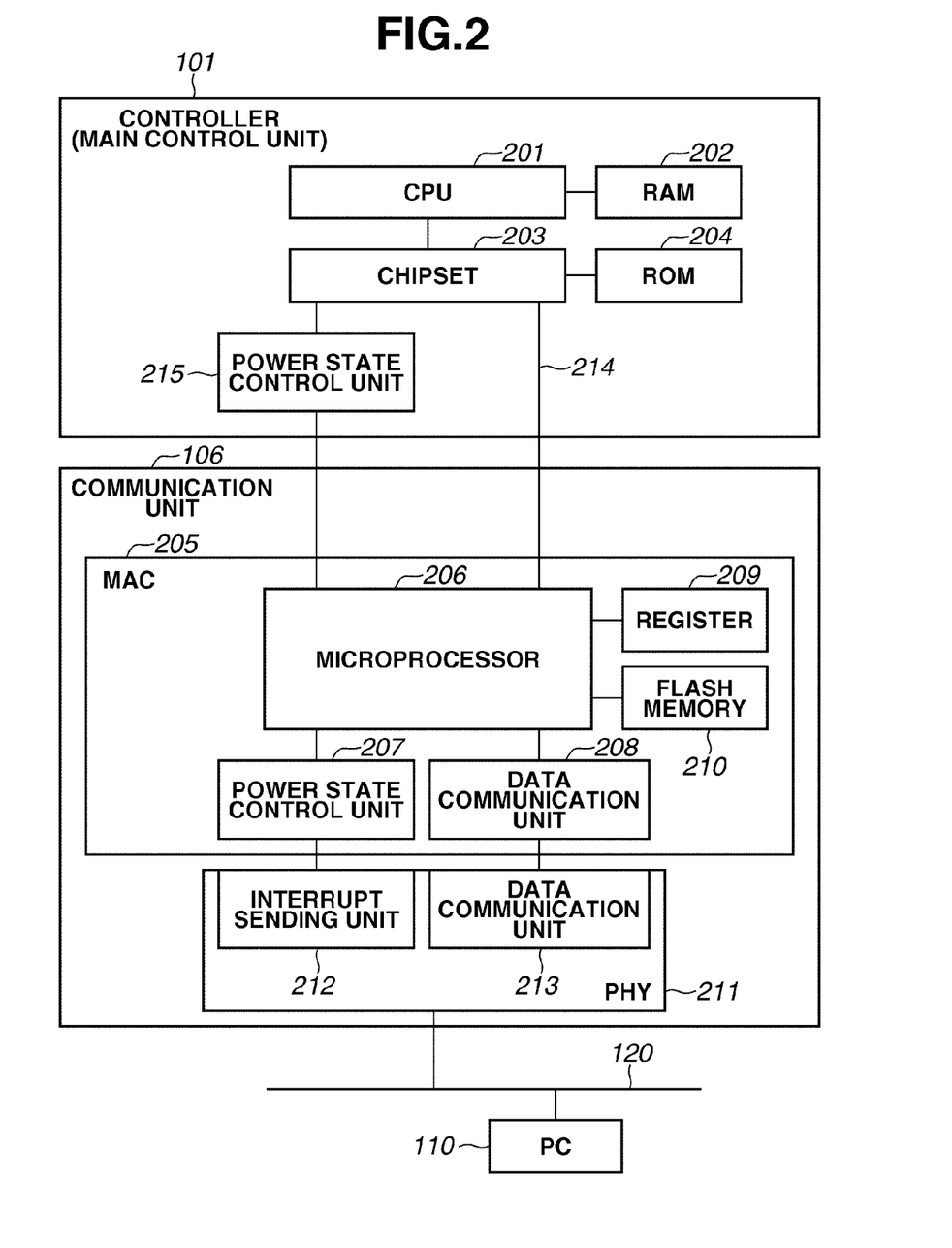
FIG. 2 illustrates respective configurations of a controller and a communication unit.

Respective configurations of the controller 101 and the communication unit 106 will be specifically described below with reference to FIG. 2.

The configuration of the controller 101 will be first described. The controller 101 includes the CPU 201, a random access memory (ROM) 202, a chipset 203, a read-only memory (ROM) 204, and a power state control unit 215. The CPU 201 reads out a control program stored in the ROM 204, to control the image forming apparatus 100. The RAM 202 is used as a temporary storage area as a main memory or a work area of the CPU 201, and is connected to a memory controller within the CPU 201. The chipset 203 controls various types of input/output (I/O) devices, and communicates with a media access control (MAC) 205 in the communication unit 106. The ROM 204 is connected to a ROM controller within the chipset 203. A power state control unit 215 controls supply of a clock to the controller 101 and supply of power to the operation unit 102, the scanner 103, the HDD 104, the printer 105, and the communication unit 106.

The configuration of the communication unit 106 will be described below. The communication unit 106 includes the MAC 205 and a physical layer (PHY) 211 serving as a physical layer communication control module for the network 120.

The MAC 205 includes a microprocessor 206, a register 209, a flash memory 210, a power state control unit 207, and a data communication unit 208. The microprocessor 206 controls the entire communication unit 106. The microprocessor 206 sends an interrupt signal to the power state control unit 215 in the controller 101 and performs data communication with the chipset 203 via a PCLe interface (I/F) 214. The power state control unit 207 receives an interrupt signal sent from the PHY 211 and controls the supply of a clock to the microprocessor 206. The data communication unit 208 performs data communication with the PHY 211.

The PHY 211 is connected to the network 120. The PHY 211 includes an interrupt sending unit 212 that sends the interrupt signal to the microprocessor 206 and a data communication unit 213 that performs data communication with the microprocessor 206.

Figure 3:
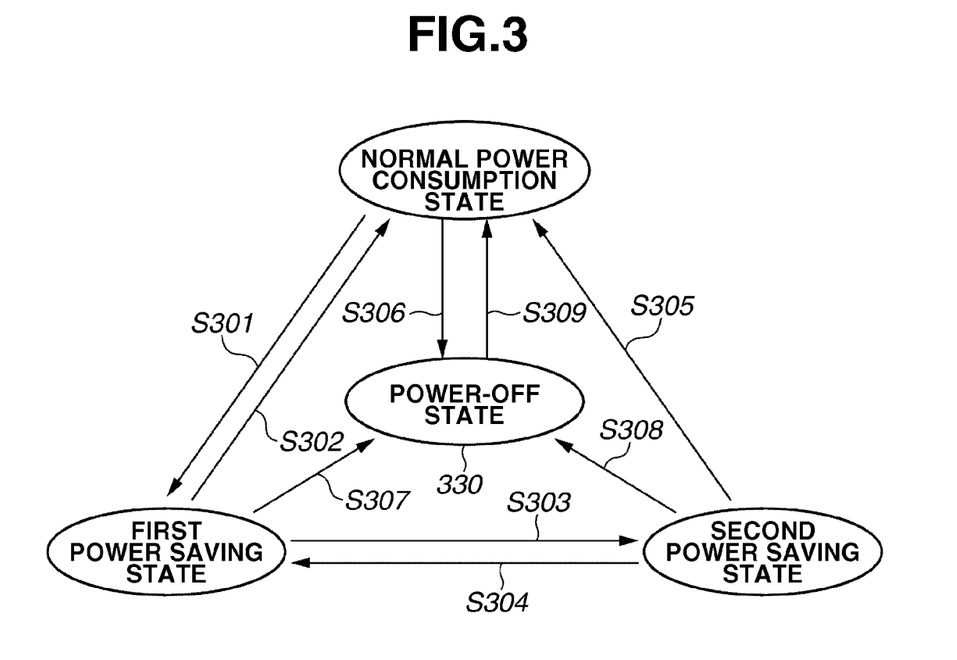
FIG. 3 illustrates a shift of a power state.

Power control in the image forming apparatus 100 will be described below. In the present exemplary embodiment, the image forming apparatus 100 can operate in four power states, i.e., a normal power consumption state, a first power saving state, a second power saving state, and a power-off state. FIG. 3 illustrates a shift among the four power states.

When the image forming apparatus 100 is started, the image forming apparatus 100 enters the normal power consumption state. In the normal power consumption state, power is supplied to the entire image forming apparatus 100, and the image forming apparatus 100 can perform reading processing using the scanner 103 and print processing using the printer 105.

When a predetermined condition is satisfied in the normal power consumption state, then in step S301, the image forming apparatus 100 shifts to the first power saving state.

The predetermined condition specifically includes a case where the user inputs an instruction to shift to the first power saving state and a case where a predetermined period of time (e.g., 10 minutes) has elapsed in the normal power consumption state.

In the first power saving state, the power state control unit 215 in the controller 101 cuts off the supply of power to the operation unit 102, the scanner 103, the HDD 104, and the printer 105. While power is supplied to the controller 101, the power state control unit 215 causes the controller 101 to enter a wait for interrupt (WFI) state. The WFI state of the controller 101 is a state where the controller 101 waits for an interrupt signal sent from the communication unit 106. Further, in the first power saving state, the power state control unit 215 stops the supply of a clock to the CPU 201, the RAM 202, the chipset 203, and the ROM 204. Since the supply of the clock to part of the controller 101 (the CPU 201, the RAM 202, the chipset 203, and the ROM 204 in the present exemplary embodiment) is stopped, the controller 101 in the first power saving state consumes less power as compared with the controller 101 in the normal power consumption state.

While power is supplied to the communication unit 106 in the first power saving state, the power state control unit 207 in the communication unit 106 causes the microprocessor 206 to enter a WFI state. The WFI state of the microprocessor 206 is a state where the microprocessor 206 waits for the interrupt signal sent from the PHY 211. Further, in the first power saving state, the power state control unit 207 stops the supply of the clock to the microprocessor 206.

When the user inputs an instruction to shift the image forming apparatus 100 in the first power saving state to the normal power consumption state, then in step S302, the image forming apparatus 100 shifts to the normal power consumption state. When the PHY 211 receives a packet sent from the external apparatus such as the PC 110 via the network 120, the interrupt signal is sent to the power state control unit 207 in the communication unit 106 from the interrupt sending unit 212 in the PHY 211. When the power state control unit 207 receives the interrupt signal, then in step S303, the image forming apparatus 100 shifts to the second power saving state.

The second power saving state will be described. The second power saving state is similar to the first power saving state except that the power state control unit 207 in the communication unit 106 cancels the WFI state of the microprocessor 206 so that the clock is further supplied to the microprocessor 206. More specifically, in the first power saving state where the supply of the clock to part of the communication unit 106 (the microprocessor 206 in the present exemplary embodiment) is stopped, the communication unit 106 consumes less power as compared with the communication unit 106 in the second power saving state.

In the second power saving state, the microprocessor 206 acquires the packet received by the PHY 211 (the received packet) from the data communication unit 213 in the PHY 211 using the register 209 and the flash memory 210. The microprocessor 206 analyzes the received packet, which has been acquired, and determines a response to the received packet. More specifically, the microprocessor 206 selects one of the following processing operations: awaking the controller 101; causing the communication unit 106 to respond to the received packet without awaking the controller 101 (hereinafter referred to as a proxy response); and discarding the received packet.

If the received packet matches a previously-determined Wake on LAN (WOL) pattern, the microprocessor 206 determines to awake the controller 101, to send a wake signal (interrupt signal) to the power state control unit 215 in the controller 101. In step S305, the image forming apparatus 100 thus shifts to the normal power consumption state. At this time, the received packet is sent to the controller 101 from the microprocessor 206 via the PCLe I/F 214 so that the awoken controller 101 performs processing for the received packet. The WOL pattern will be described below in FIG. 5.

If the received packet matches a previously-determined proxy response pattern, the microprocessor 206 causes the communication unit 106 to performs the proxy response without awaking the controller 101. When the communication unit 106 performs the proxy response, then in step S304, the image forming apparatus 100 shifts to the first power saving state. The proxy response pattern will be described below in FIG. 5.

If the received packet matches neither the WOL pattern nor the proxy response pattern, the microprocessor 206 causes the communication unit 106 to discard the received packet. When the communication unit 106 discards the received packet, then in step S304, the image forming apparatus 100 shifts to the first power saving state.

As described above, the second power saving state is a state where processing for the received packet (awaking the controller 101, the proxy response or the discarding the received packet by the communication unit 106) can be determined. On the other hand, the first power saving state is a state where processing for the received packet (awaking the controller 101, the proxy response or the discarding the received packet by the communication unit 106) cannot be determined.

In one of the normal power consumption state, the first power saving state, and the second power saving state, when the user turns off a power switch (not illustrated) in the image forming apparatus 100, then in step S306, S307, or S308, the image forming apparatus 100 shifts to the power-off state. The power-off state is a state where power is not supplied to any unit in the image forming apparatus 100. When the user turns on the power switch in the image forming apparatus 100 in the power-off state, then in step S309, the image forming apparatus 100 shifts to the normal power consumption state.

Figure 4:
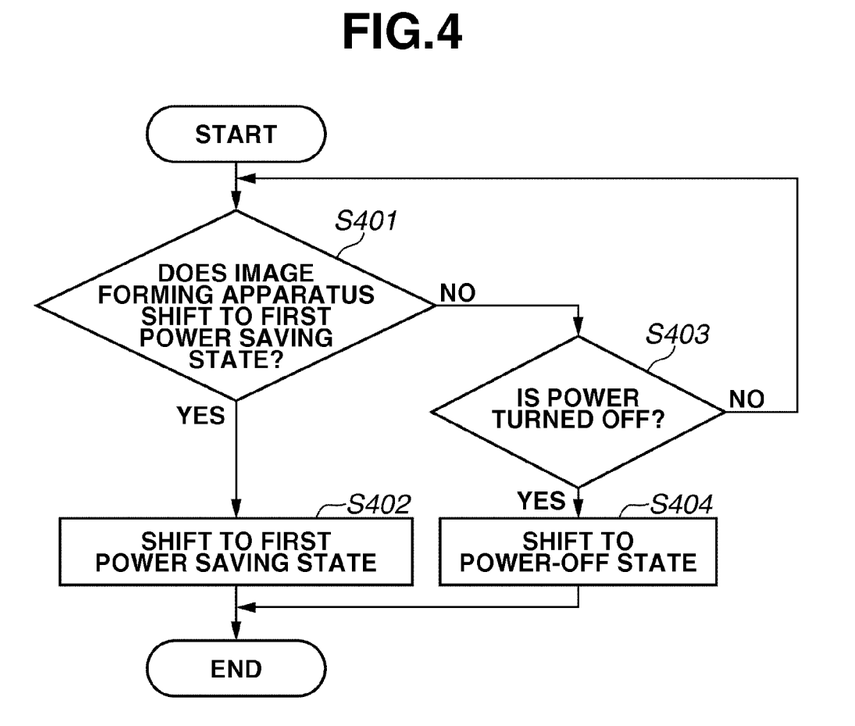
FIG. 4 is a flowchart illustrating processing performed when an image forming apparatus operates in a normal power consumption state.

Processing by the image forming apparatus 100 performed when the image forming apparatus 100 is in the normal power consumption state will be described below with reference to a flowchart in FIG. 4. The CPU 201 in the image forming apparatus 100 performs each of steps in the flowchart in FIG. 4.

In step S401, the CPU 201 determines whether the image forming apparatus 100 shifts from the normal power consumption state to the first power saving state. In the present exemplary embodiment, if the user inputs the instruction to shift to the first power saving state and if the predetermined period of time (e.g., 10 minutes) has elapsed in the normal power consumption state, the CPU 201 determines that the image forming apparatus 100 shifts from the normal power consumption state to the first power saving state. If the CPU 201 determines that the image forming apparatus 100 shifts from the normal power consumption state to the first power saving state (YES in step S401), the processing proceeds to step S402. In step S402, the image forming apparatus 100 shifts from the normal power consumption state to the first power saving state. As described in FIG. 3, the image forming apparatus 100 shifts to the first power saving state so that both the controller 101 and the communication unit 106 enter the power saving state.

On the other hand, if the CPU 201 determines that the image forming apparatus does not shift from the normal power consumption state to the first power saving state (NO in step S401), the processing proceeds to step S403. In step S403, the CPU 201 determines whether the power to the image forming apparatus 100 is turned off. More specifically, if the user turns off the power switch in the image forming apparatus 100, the CPU 201 determines that the power to the image forming apparatus 100 is turned off (YES in step S403), and the processing proceeds to step S404. In step S404, the image forming apparatus 100 shifts to the power-off state. On the other hand, if the user does not turn off the power switch in the image forming apparatus 100, the CPU 201 determines that the power to the image forming apparatus 100 is not turned off (NO in step S403), the processing returns to step S401.

Figure 5:
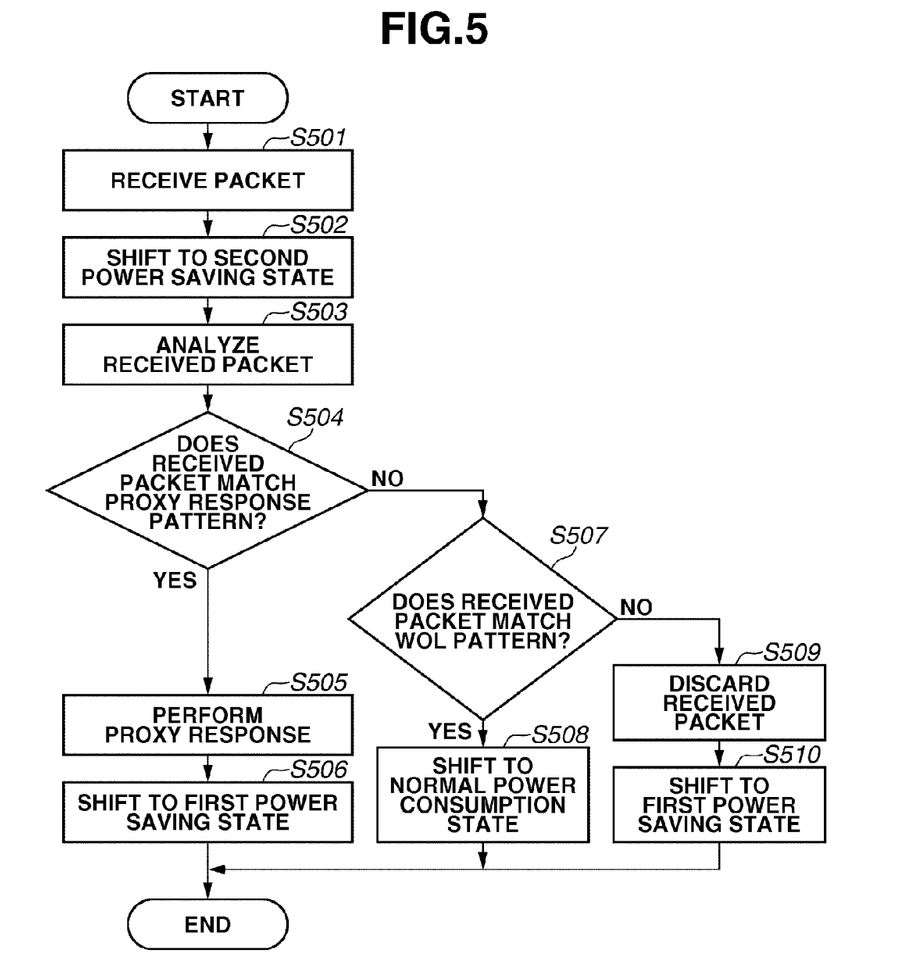
FIG. 5 is a flowchart illustrating processing performed when the image forming apparatus operates in a first power saving state and receives a packet sent via a network.

Processing by the image forming apparatus 100 to be performed when the packet sent from the external apparatus such as the PC 110 has been received, while the image forming apparatus 100 is in the first power saving state, will be described with reference to a flowchart in FIG. 5. The microprocessor 206 in the image forming apparatus 100 performs each of steps in the flowchart in FIG. 5.

In step S501, the PHY 211 in the communication unit 106 receives the packet sent from the external apparatus. When the packet sent from the external apparatus is received, then in step S502, the image forming apparatus 100 shifts from the first power saving state to the second power saving state. In the present exemplary embodiment, the PHY 211, which has received the packet, sends the interrupt signal to the power state control unit 207 in the communication unit 106, and the power state control unit 207, which has received the interrupt signal, cancels the WFI state of the microprocessor 206. Further, the image forming apparatus 100 shifts from the first power saving state to the second power saving state when the power state control unit 207 supplies the clock to the microprocessor 206. When the image forming apparatus 100 shifts from the first power saving state to the second power saving state, the power saving state of the communication unit 106 is canceled.

In step S503, the microprocessor 206 then receives the received packet from the PHY 211, to analyze the received packet. In step S504, the microprocessor 206 determines whether the received packet matches the proxy response pattern. The proxy response pattern represents the pattern of a packet to which the communication unit 106 can respond without awaking the controller 101, and is stored in the flash memory 210. More specifically, a pattern representing an address resolution protocol (ARP) request addressed to the image forming apparatus 100 and a pattern representing a device information acquisition request of a simple network management protocol (SNMP) are stored in the flash memory 210.

In step S504, the microprocessor 206 determines whether the received packet matches the proxy response pattern. If the microprocessor 206 determines that the received packet matches the proxy response pattern (YES in step S504), the processing proceeds to step S505. In step S505, the microprocessor 206 generates a response packet for responding to a request represented by the received packet, and sends the response packet, to perform the proxy response. By the proxy response performed in step S505, the communication unit 106 can respond to the request represented by the received packet without awaking the controller 101. In this case, the image forming apparatus 100 consumes less power as compared with a case where the controller 101 responds to the request. When the microprocessor 206 performs the proxy response in step S505, the processing proceeds to step S506. In step S506, the image forming apparatus 100 shifts to the first power saving state. In the present exemplary embodiment, the microprocessor 206 enters the WFI state again, and the power state control unit 207 in the communication unit 106 stops the supply of the clock to the microprocessor 206 so that the image forming apparatus 100 shifts from the second power saving state to the first power saving state.

If the microprocessor 206 determines that the received packet does not match the proxy response pattern (NO in step S504), the processing proceeds to step S507. In step S507, the microprocessor 206 determines whether the received packet matches the WOL pattern. The WOL pattern represents the pattern of a packet that requires awaking the controller 101, i.e., the pattern of a packet that cannot be processed by only the communication unit 106, and is stored in the flash memory 210. More specifically, a pattern representing a magic packet addressed to the image forming apparatus 100 and a pattern representing a print job are stored as the WOL pattern in the flash memory 210.

If the microprocessor 206 determines that the received packet matches the WOL pattern (YES in step S507), the processing proceeds to step S508. In step S508, the image forming apparatus 100 shifts from the second power saving state to the normal power consumption state. The image forming apparatus 100 shifts from the second power saving state to the normal power consumption state so that the power saving state of the controller 101 is canceled. In the present exemplary embodiment, when the microprocessor 206 sends the interrupt signal to the power state control unit 215 in the controller 101, and the power state control unit 215 receives the interrupt signal, the WFI state of the controller 101 is canceled. Further, the power state control unit 215 supplies the clock to the CPU 201, the RAM 202, the chipset 203, and the ROM 204. The controller 101, to which the clock has been supplied, supplies the power to the operation unit 102, the scanner 103, the HDD 104, the printer 105, and the communication unit 106.

When the image forming apparatus 100 shifts from the second power saving state to the normal power consumption state, the controller 101 receives the received packet from the microprocessor 206 via the PCLe I/F 214, and performs processing corresponding to the received packet. If the received packet is the print job, for example, the printer 105 performs the print processing. After the processing corresponding to the received packet is completed, the image forming apparatus may immediately shift to the first power saving state. Alternatively, the image forming apparatus 100 may wait in the normal power consumption state until a condition for shifting to the first power saving state is satisfied.

If the microprocessor 206 determines that the received packet does not match the WOL pattern (NO in step S507), the processing proceeds to step S509. In step S509, the microprocessor 206 discards the received packet. In step S510, the image forming apparatus 100 shifts to the first power saving state.

The above-mentioned proxy response pattern and WOL pattern are stored in the ROM 204 in the controller 101 before product shipment of the image forming apparatus 100 or the operation by the user via the operation unit 102. The proxy response pattern and the WOL pattern, which are stored in the ROM 204, are notified to the communication unit 106 and are stored in the flash memory 210 at predetermined timing (e.g., when the image forming apparatus 100 shifts from the normal power consumption state to the first power saving state or when the image forming apparatus 100 is started).

As described above, according to the present exemplary embodiment, the image forming apparatus 100 can wait for receiving the packet in the first power saving state where the controller (main control unit) 101 is in the power saving state and the communication unit 106 is in the power saving state. In such a case, the image forming apparatus 100 consumes less power as compared with the case where the image forming apparatus 100 waits for receiving the packet while the controller 101 is in the power saving state but the communication unit 106 is in the normal power consumption state.

In the first exemplary embodiment, the proxy response for causing the communication unit 106 in place of the controller 101 to respond to the received packet has been described. In a second exemplary embodiment, not a response to a received packet but a periodic sending to periodically send information to an external apparatus, which is performed by a controller 101, and a proxy sending to perform a periodic sending, which is performed by a communication unit 106 in place of the controller 101, will be described.

Figure 6:
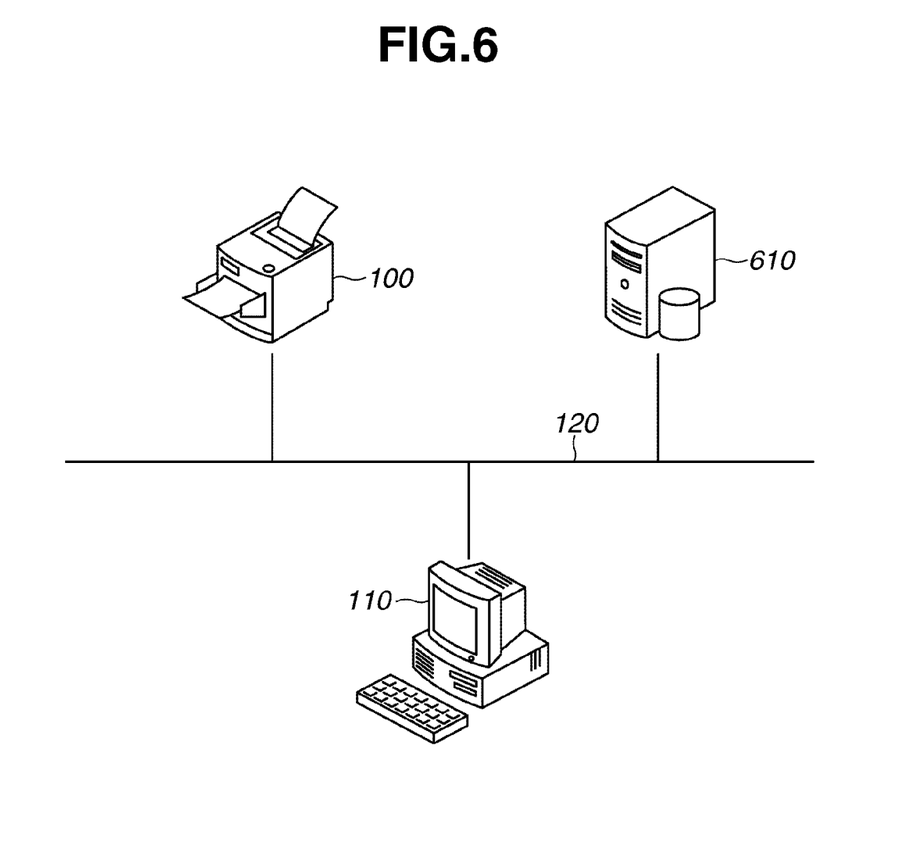
FIG. 6 illustrates a periodic sending according to a second exemplary embodiment of the present invention.

The periodic sending will be first described with reference to FIG. 6. An image forming apparatus 100, a PC 110, and a network 120 are similar to those in the first exemplary embodiment. In the present exemplary embodiment, the image forming apparatus 100 notifies an Internet Protocol (IP) address and a Network Basic Input/Output System (NetBIOS) name of the image forming apparatus 100 to a master browse server 610 as information about the image forming apparatus 100. The master browse server 610 manages apparatuses on the network 120 as a list format using the notified IP address and NetBIOS name. Since the list needs to be periodically updated, the image forming apparatus 100 needs to notify the IP address and the NetBIOS name to the master browse server 610 periodically (e.g., every five minutes).

Figure 7:
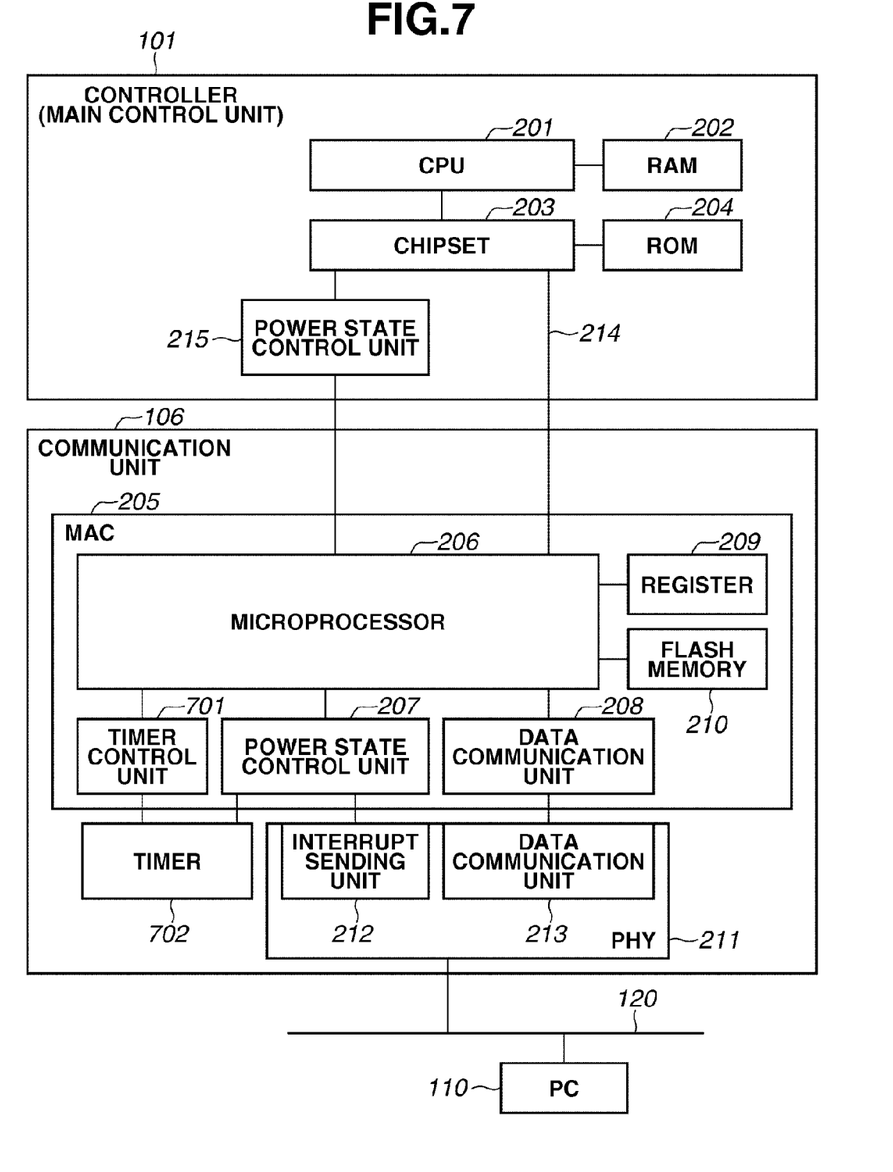
FIG. 7 illustrates respective configurations of a controller and a communication unit.

Respective configurations of the controller 101 and the communication unit 106 in the image forming apparatus 100 will be specifically described below with reference to FIG. 7. A configuration of the image forming apparatus 100 according to the present exemplary embodiment is similar to the configuration described in FIGS. 1 and 2, and hence only portions different from those illustrated in FIGS. 1 and 2 will be described.

If the image forming apparatus 100 is in a normal power consumption state, the controller 101 performs the periodic sending. A ROM 204 stores information representing the time when the periodic sending is to be performed next (hereinafter referred to as the subsequent periodic sending time).

If the image forming apparatus 100 is in a power saving state (a first power saving state or a second power saving state), not the controller 101 but the communication unit 106 performs the periodic sending. Performing the periodic sending by not the controller 101 but the communication unit 106 is referred to as the proxy sending. A timer control unit 701 stores the subsequent periodic sending time in a timer 702. At the time stored in the timer 702, an interrupt signal is sent to a power state control unit 207 in the communication unit 106 from the timer 702.

Figure 8:
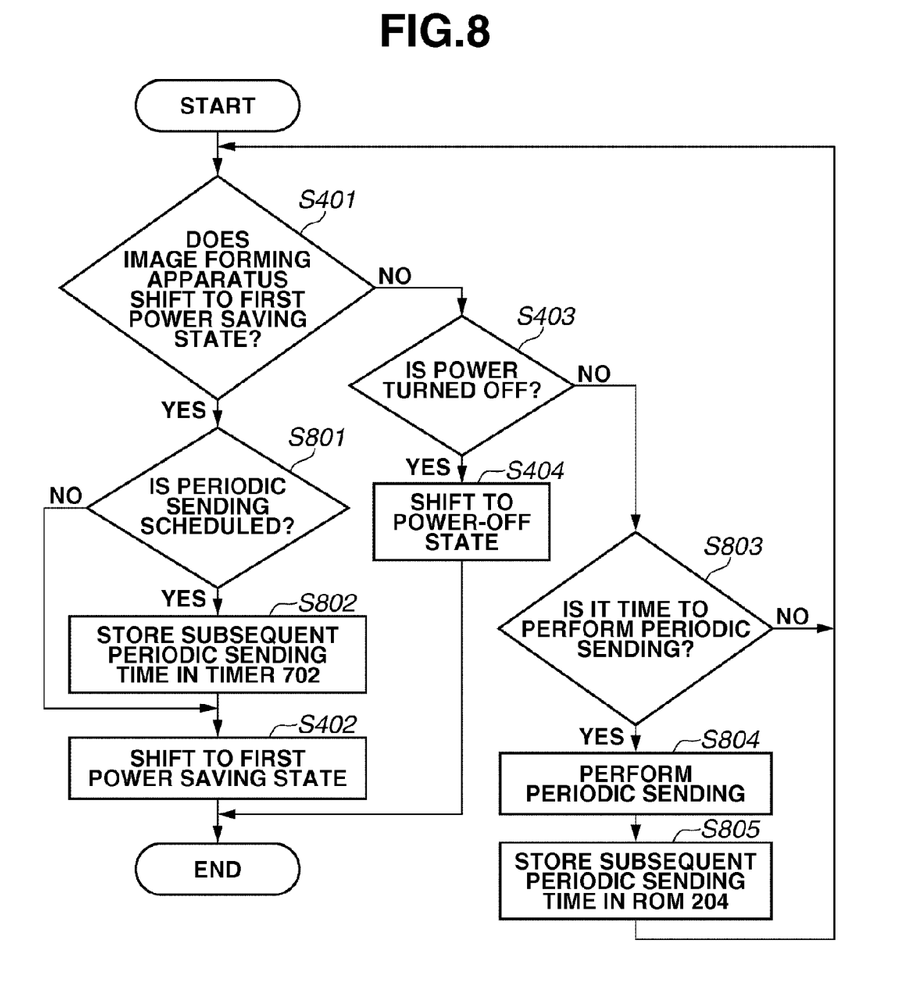
FIG. 8 is a flowchart illustrating processing performed when an image forming apparatus operates in a normal power consumption state.

If the image forming apparatus 100 is in the normal power consumption state, processing to be performed by the image forming apparatus 100 will be described below with reference to FIG. 8. A CPU 201 in the image forming apparatus 100 performs each of steps in the flowchart in FIG. 8. Out of the steps illustrated in FIG. 8, the steps with the same numbers as those illustrated in FIG. 4 perform similar processes to those illustrated in FIG. 4, and hence description thereof is not repeated.

If the CPU 201 determines that the image forming apparatus 100 shifts from the normal power consumption state to the first power saving state (YES in step S401), the processing proceeds to step S801. In step S801, the CPU 201 determines whether the periodic sending is scheduled. In the present exemplary embodiment, if the subsequent periodic sending time is stored in the ROM 204, the CPU 201 determines that the periodic sending is scheduled (YES in step S801), and the processing proceeds to step S802. In step S802, the CPU 201 stores the subsequent periodic sending time in the timer 702 in the communication unit 106. On the other hand, if the subsequent periodic sending time is not stored in the ROM 204, the CPU 201 determines that the subsequent periodic sending is not scheduled (NO in step S801), and the processing proceeds to step S402.

In step S803, the CPU 201 determines whether it is the time to perform the periodic sending. If the current time is the subsequent periodic sending time stored in the ROM 204, the CPU 201 determines that it is the time to perform the periodic sending (YES in step S803), and the processing proceeds to step S804. On the other hand, if the current time is not the subsequent periodic sending time stored in the ROM 204, the CPU 201 determines that it is not the time to perform the periodic sending (NO in step S803), and the processing proceeds to step S401.

In step S804, the controller 101 performs the periodic sending. In the present exemplary embodiment, the controller 101 notifies the IP address and the NetBIOS name of the image forming apparatus 100 to the master browse server 610. In step S805, the CPU 201 stores the subsequent periodic sending time in the ROM 204.

Figure 9:
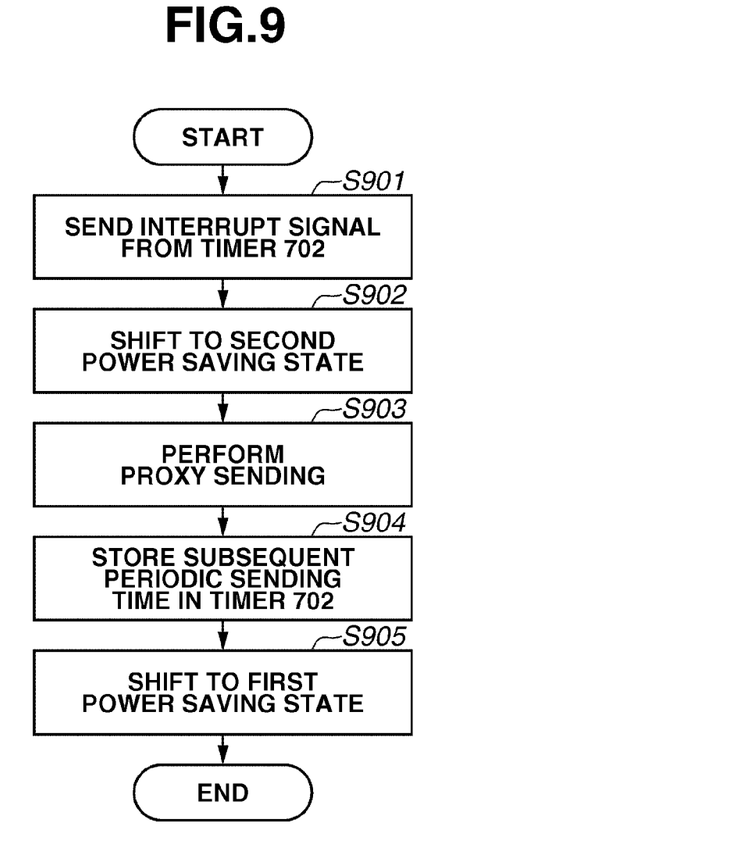
FIG. 9 is a flowchart illustrating a proxy sending performed by a communication unit.

The proxy sending performed by the communication unit 106 will be described below with reference to a flowchart in FIG. 9. A microprocessor 206 in the image forming apparatus 100 performs each of steps in the flowchart in FIG. 9.

When it is the subsequent periodic sending time stored in the timer 702 if the image forming apparatus 100 is in the first power saving state, then in step S901, the interrupt signal is sent to the power state control unit 207 in the communication unit 106 from the timer 702. In step S902, the image forming apparatus 100 shifts from the first power saving state to the second power saving state. In the present exemplary embodiment, the power state control unit 207, which has received the interrupt signal, cancels a WFI state of the microprocessor 206 and further supplies a clock to the microprocessor 206.

In step S903, the microprocessor 206 performs the proxy sending. In the present exemplary embodiment, the microprocessor 206 (the communication unit 106) in place of the controller 101 notifies the master browse server 610 of the IP address and the NetBIOS name of the image forming apparatus 100. When the proxy sending is completed, the processing proceeds to step S904. In step S904, the timer control unit 701 stores the subsequent periodic sending time in the timer 702. In step S905, the image forming apparatus 100 shifts to the first power saving state. In the present exemplary embodiment, the power state control unit 207 causes the microprocessor 206 to enter the WFI state, and further, the supply of the clock to the microprocessor 206 is stopped.

As described above, in the present exemplary embodiment, the image forming apparatus 100 shifts from the first power saving state to the second power saving state to perform the proxy sending. Further, in the present exemplary embodiment, the image forming apparatus 100 shifts from the first power saving state to the second power saving state also when receiving a packet sent from the external apparatus. More specifically, the image forming apparatus 100 frequently shifts from the first power saving state to the second power saving state. In view of this, the present exemplary embodiment aims at keeping the first power saving state, as long as possible, where the power consumption can be reduced to the minimum.

Figure 10:
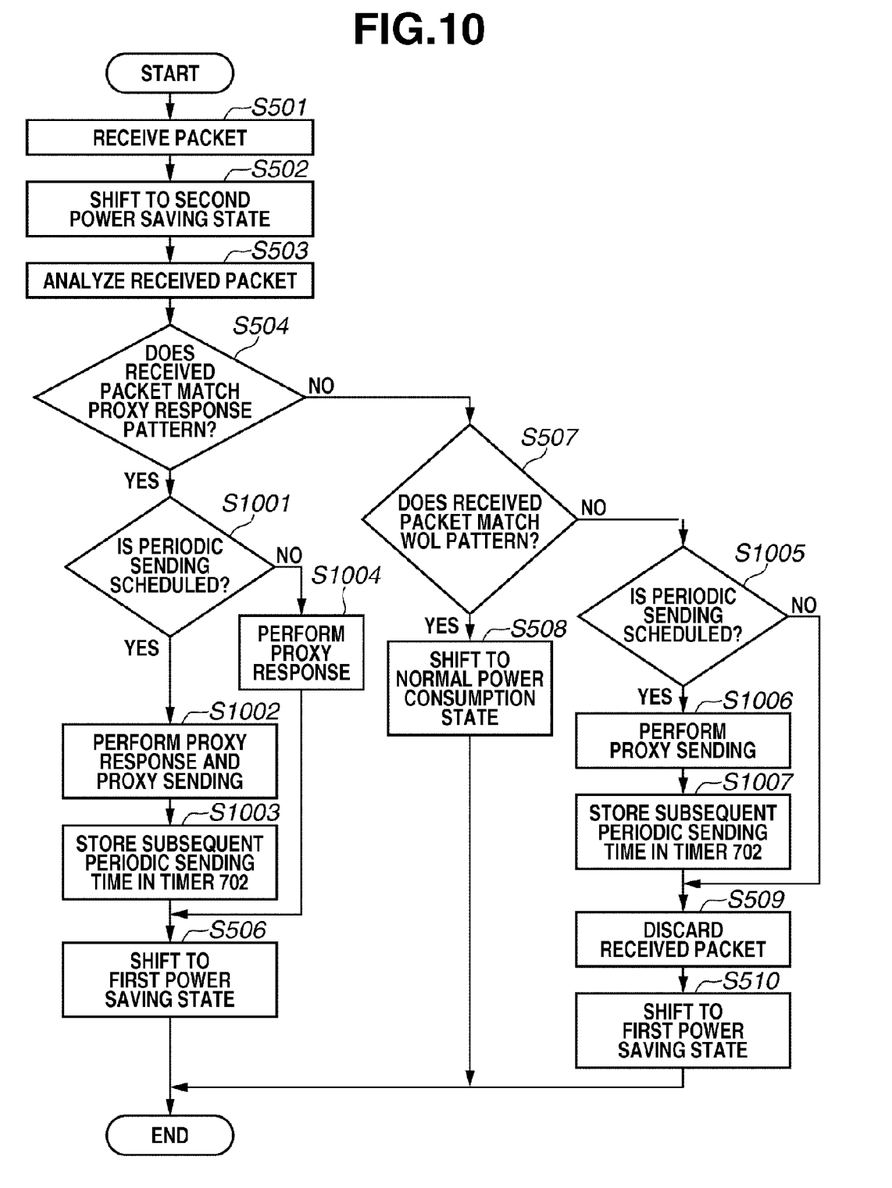
FIG. 10 is a flowchart illustrating processing performed when an image forming apparatus operates in a first power saving state and receives a packet sent via a network.

A flowchart in FIG. 10 will be described. The flowchart in FIG. 10 illustrates processing by the image forming apparatus 100 performed when the image forming apparatus 100 receives the packet sent from the external apparatus such as the PC 110 if the image forming apparatus 100 is in the first power saving state. The microprocessor 206 performs each of the steps in the flowchart in FIG. 5. Out of steps illustrated in FIG. 10, the steps with the same numbers as those illustrated in FIG. 5 perform similar processes to those illustrated in FIG. 5, and hence description thereof is not repeated.

If the microprocessor 206 determines that the received packet matches a proxy response pattern (YES in step S504), the processing proceeds to step S1001. In step S1001, the microprocessor 206 determines whether the periodic sending is scheduled. In the present exemplary embodiment, if the subsequent periodic sending time is stored in the timer 702, the microprocessor 206 determines that the periodic sending is scheduled (YES in step S1001), and the processing proceeds to step S1002.

In step S1002, the microprocessor 206 performs both a proxy response and a proxy sending. The proxy response performed in step S1002 is similar to the proxy response described in step S505 illustrated in FIG. 5. The proxy sending is performed ahead of schedule even if the current time does not reach the subsequent periodic sending time. Thus, a periodic sending to the master browse server 610 is also performed at the timing at which the image forming apparatus 100 shifts from the first power saving state to the second power saving state. In the present exemplary embodiment, the microprocessor 206 performs the proxy response and the proxy sending in parallel. The first power saving state where the power consumption can be reduced to the minimum can be kept longer when the microprocessor 206 performs the proxy response and the proxy sending in parallel than when the proxy response and the proxy sending are performed at different timings.

When the microprocessor 206 performs both the proxy response and the proxy sending in step S1002, the processing proceeds to step S1003. In step S1003, the timer control unit 701 stores the subsequent periodic sending time in the timer 702. In step S506, the image forming apparatus 100 shifts to the first power saving state.

On the other hand, if the microprocessor 206 determines that the periodic sending is not scheduled (NO in step S1001), the processing proceeds to step S1004. In step S1004, the microprocessor 206 performs a proxy response. The proxy response performed in step S1004 is similar to the proxy response described in step S505 illustrated in FIG. 5. When the microprocessor 206 performs the proxy response in step S1004, the processing proceeds to step S506. In step S506, the image forming apparatus 100 shifts to the first power saving state.

If the received packet matches neither the proxy response pattern nor the WOL pattern (NO in step S507), the processing proceeds to step S1005. In step S1005, the microprocessor 206 determines whether the periodic sending is scheduled. In the present exemplary embodiment, if the subsequent periodic sending time is stored in the timer 702, the microprocessor 206 determines that the periodic sending is scheduled (YES in step S1005), and the processing proceeds to step S1006.

In step S1006, the microprocessor 206 performs the proxy sending. In step S1007, the timer control unit 701 stores the subsequent periodic sending time in the timer 702, and the processing proceeds to step S509. In step S509, the microprocessor 206 discards the received packet.

On the other hand, if the microprocessor 206 determines that the periodic sending is not scheduled (NO in step S1005), the processing proceeds to step S509. In step S509, the microprocessor 206 discards the received packet.

As described above, according to the present exemplary embodiment, the proxy sending can be performed at the timing at which the image forming apparatus 100 shifts from the first power saving state to the second power saving state due to a factor different from the periodic sending by the communication unit 106, e.g., the proxy response. Thus, the first power saving state where the power consumption can be reduced to the minimum can be kept longer when the proxy response and the proxy sending are performed at the same timing than when the proxy response and the proxy sending are performed at different timings.

While the notification of the IP address and the NetBIOS name of the image forming apparatus 100 to the master browse server 610 has been described as an example of the periodic sending (proxy sending) in the present exemplary embodiment, the periodic sending is not limited to this. Not only notifying the IP address and the NetBIOS name but also periodically sending information to the external apparatus by the image forming apparatus 100 is included in the periodic sending (proxy sending) in the present exemplary embodiment.

The present invention is also implemented by performing the following processing. More specifically, software (a program) for implementing the function of the above-mentioned exemplary embodiment is supplied to a system or an apparatus via a network or various types of storage media, and a computer (or a CPU, a micro processing unit (MPU), etc.) in the system or the apparatus reads out and executes the program.

According to the present exemplary embodiment of the present invention, in the image forming apparatus, not only the power saving state of the main control unit but also the power saving state of the communication unit is achieved so that further power saving of the image forming apparatus can be implemented.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(registered trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a national phase application of international application PCT/JP2013/003047, filed on May 13, 2013, which is hereby incorporated by reference herein in its entirety, and this application claims the benefit of Japanese Patent Application No. 2012-115761, filed May 21, 2012, which is hereby incorporated by reference herein in its entirety.

The invention claimed is:

1. An image forming apparatus including a media access control (MAC) that communicates with an external apparatus via an interface and a controller that communicates with the external apparatus via the MAC, the image forming apparatus comprising:
the interface configured to receive a packet via a network;
one or more processors;
memory containing instructions that when executed by the one or more processors, cause the one or more processors to:
receive, by the interface, the packet via the network, at a time when the image forming apparatus is in a power saving mode in which both the controller and the MAC are in a power saving state, wherein the power saving state of the MAC is a state where a clock is not supplied to part of the MAC;
in a case where the image forming apparatus is operating in the power saving mode in which both the MAC and the controller are in a power saving state, when the interface receives the packet, cancel the power saving state of the MAC to cause the packet to be analyzed, wherein the power saving state of the MAC is canceled by supplying the clock;
analyze the packet;
determine, based on a result of analyzing of the packet, whether the power saving state of the controller is to be canceled for execution of processing on the packet by the controller;
cancel the power saving state of the controller in a case where it has been determined that the power saving state of the controller is to be canceled; and
in a case where it has been determined that the power saving state of the controller is not to be canceled, have the MAC perform the processing on the packet and do not cancel the power saving state of the controller.

2. The image forming apparatus according to claim 1, wherein the MAC shifts to the power saving state when the MAC has completed performing the processing on the packet.

3. The image forming apparatus according to claim 1, wherein the controller performs the processing on the packet after the power saving state of the controller has been canceled.

4. The image forming apparatus according to claim 3, wherein the packet is a print job, and the controller performs print processing based on the print job after the power saving state of the controller has been canceled.

5. The image forming apparatus according to claim 1, wherein the power saving state of the controller is a state where a clock is not supplied to part of the controller, and
wherein the power saving state of the controller is canceled by supplying the clock.

6. The image forming apparatus according to claim 1, wherein, in a case where it has been determined that the power saving state of the controller is not to be canceled, the MAC discards the packet and the power saving state of the controller is not canceled.

7. The image forming apparatus according to claim 6, wherein MAC shifts to the power saving state when the MAC has discarded the packet.

8. A method for controlling an image forming apparatus including a media access control (MAC) that communicates with an external apparatus via an interface and a controller that communicates with the external apparatus via the MAC, the method comprising:
receiving, at the interface of the image forming apparatus, a packet via a network, at a time when the image forming apparatus is in a power saving mode in which both the controller and the MAC are in a power saving state, wherein the power saving state of the MAC is a state where a clock is not supplied to part of the MAC;
in a case where the image forming apparatus is operating in the power saving mode in which both the MAC and the controller are in a power saving state, when the packets is received, canceling the power saving state of the MAC to cause the packet to be analyzed, wherein the power saving state of the MAC is canceled by supplying the clock;
determining based on a result of an analysis of the packet, whether the power saving state of the controller is to be canceled for execution of processing on the packet by the controller;
canceling the power saving state of the controller in a case where it has been determined that the power saving state of the controller is to be canceled; and
in a case where it has been determined that the power saving state of the controller is not to be canceled, having the MAC perform the processing on the packet and not cancelling the power saving state of the controller.

9. A non-transitory computer-readable storage medium storing instructions that when executed cause a computer to perform a process, the computer including a MAC that communicates with an external apparatus via an interface and a controller that communicates with the external apparatus via the MAC, the process comprising:
receiving a packet via the interface, at a time when the computer is in a power saving mode in which both the controller and the communication processor are in a power saving state, wherein the power saving state of the MAC is a state where a clock is not supplied to part of the MAC;
in a case where the image forming apparatus is operating in the power saving mode in which both the MAC and the controller are in a power saving state, when the packets is received , canceling the power saving state of the MAC to cause the packet to be analyzed, wherein the power saving state of the MAC is canceled by supplying the clock;
determining based on a result of an analysis of the packet, whether the power saving state of the controller is to be canceled for execution of processing on the packet by the controller;
canceling the power saving state of the controller in a case where it has been determined that the power saving state of the controller is to be canceled; and
in a case where it has been determined that the power saving state of the controller is not to be canceled, having the MAC perform the processing on the packet and not cancelling the power saving state of the controller.

* * * * *